US009890851B2

(12) United States Patent
Anderson et al.

(10) Patent No.: US 9,890,851 B2
(45) Date of Patent: Feb. 13, 2018

(54) SYSTEM AND METHOD TO CONTROL THE OPERATION OF A TRANSMISSION USING ENGINE FUEL CONSUMPTION DATA

(71) Applicant: Allison Transmission, Inc., Indianapolis, IN (US)

(72) Inventors: Jessica Anderson, Indianapolis, IN (US); John A. Byerly, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 129 days.

(21) Appl. No.: 14/958,388

(22) Filed: Dec. 3, 2015

(65) Prior Publication Data

US 2017/0159802 A1 Jun. 8, 2017

(51) Int. Cl.
| | | |
|---|---|---|
| *F16H 61/02* | (2006.01) | |
| *F16H 59/74* | (2006.01) | |
| *F16H 61/00* | (2006.01) | |

(52) U.S. Cl.
CPC ......... *F16H 61/0213* (2013.01); *F16H 59/74* (2013.01); *F16H 61/0204* (2013.01); *F16H 2059/743* (2013.01); *F16H 2061/0015* (2013.01); *F16H 2061/022* (2013.01)

(58) Field of Classification Search
None
See application file for complete search history.

(56) References Cited

U.S. PATENT DOCUMENTS

| 4,364,265 A | 12/1982 | Dickson |
| 5,750,887 A | 5/1998 | Schricker |
| 5,771,861 A | 6/1998 | Musser et al. |
| 6,363,317 B1 | 3/2002 | Druzhinina et al. |
| 6,436,005 B1 * | 8/2002 | Bellinger .......... B60W 30/1819 477/110 |
| 6,616,575 B1 * | 9/2003 | Lorentz ............... B60W 10/023 477/115 |
| 6,694,806 B2 | 2/2004 | Kumagai et al. |

(Continued)

FOREIGN PATENT DOCUMENTS

CN 101706366 A 5/2010

OTHER PUBLICATIONS

Recep Kozan, Imdat Taymaz, Mersin Gokce, "An Experimental Approach for Engine Mapping", Modern Applied Science, CCSE Journal, vol. 3, Mar. 2009; Adaparzari-Turkey.

(Continued)

*Primary Examiner* — Justin Holmes
(74) *Attorney, Agent, or Firm* — Taft Stettinius & Hollister LLP; Stephen F. Rost

(57) ABSTRACT

A system and method of controlling the operation of a transmission using fuel consumption data. The system and method includes controlling the operation of a vehicle transmission which is operatively connected to an engine having operating characteristics and operatively connected to a transmission control module having access to a memory. Fuel consumption data for an engine is converted to engine efficiency loss data representative of the engine operating. A set of polynomials is determined to provide a pattern representative of the operating characteristics the engine. A transmission controller using the pattern determines a prospective operating condition of the transmission to provide fuel efficient operation of the engine.

20 Claims, 7 Drawing Sheets

(56) References Cited

U.S. PATENT DOCUMENTS

| | | |
|---|---|---|
| 7,454,962 B2 | 11/2008 | Nishiyama et al. |
| 7,487,030 B2 | 2/2009 | Heap et al. |
| 7,512,477 B2 | 3/2009 | Quigley et al. |
| 7,908,911 B2 | 3/2011 | Renner et al. |
| 8,285,470 B2 | 10/2012 | Wang et al. |
| 8,332,108 B2 | 12/2012 | Kresse et al. |
| 8,340,925 B2 | 12/2012 | Higgins et al. |
| 8,639,431 B2 | 1/2014 | Jentz et al. |
| 2003/0216847 A1* | 11/2003 | Bellinger .......... B60W 30/1819 701/51 |
| 2012/0296532 A1 | 11/2012 | Murakami et al. |
| 2015/0073692 A1 | 3/2015 | Malikopoulos |

OTHER PUBLICATIONS

L. Corredor, A. Escobar, I. Portnoy, E. Velez, Dept. of Mechanical Engineering "Prediction of Specific Fuel Consumption in Turbocharged Diesel Engines Under Partial Load Performance", European Association for the Development of Renewable Energies, Environment and Power Quality, Mar. 28-30, 2012; Santiago De Compostela (Spain).

Jacob Keith Keller, Thesis, "A Cost Effective Method to Create Accurate Engine Performance Maps & Updating the Nebraska Pumping Plant Performance Criteria"; University of Nebraska, Lincoln, Nebraska, Jan. 2014.

Recep Kozan, Imdat Taymaz, Mersin Gokce, "An Experimental Approach for Engine Mapping", Modern Applied Science, CCSE Journal, vol. 3, No. 3, Mar. 2009; Adapazari—Turkey.

L. Corredor, A. Escobar, I. Portnoy, E. Velez, Dept. of Mechanical Engineering "Prediction of Specific Fuel Consumption in Turbocharged Diesel Engines Under Partial Load Performance", (EA4EPQ) European Association for the Development of Renewable Energies, Environment and Power Quality, Mar. 28-30, 2012; Santiago De Compostela (Spain).

* cited by examiner

SYSTEM AND METHOD TO CONTROL THE OPERATION OF A TRANSMISSION USING ENGINE FUEL CONSUMPTION DATA

CROSS-REFERENCE TO RELATED APPLICATION

U.S. Patent Application entitled "System and Method to Control the Operation of a Transmission Using Engine Patterns" filed on Dec. 3, 2015 is incorporated by reference herein in its entirety.

FIELD OF THE DISCLOSURE

The present disclosure relates to a multiple speed transmission, and more particularly to controlling the operation of a multiple speed transmission using engine fuel consumption data.

BACKGROUND

In a vehicle, a prime mover drives a set of wheels, or other ground engaging traction devices, which engages a support surface, such as a road or ground, to move the vehicle. Because the output of the prime mover, which includes engines and/or motors, must adapt to different speed requirements and road conditions, a transmission is located between the prime mover and a set of wheels to adjust the output of the prime mover in order to move the vehicle at different speeds. The transmission includes an input shaft, operatively connected to an output shaft of the prime mover, and an output shaft, operatively connected to a drivetrain connected to the wheels.

The transmission is configured to transmit power and torque from the engine to the drive train. In one type of conventional transmission, the transmission includes a variety of gears, shafts, and clutches configured to transmit torque through the transmission at finite, stepped gear ratios. Multiple speed transmissions use a number of friction clutches or brakes, planetary gearsets, shafts, and other elements to achieve a plurality of gear or speed ratio. In another type of transmission, a continuously variable transmission (CVT) is configured to continuously vary the ratio of an input rotational speed to an output rotational speed under control of a vehicle operator, typically by a speed controller input such as provided by a throttle.

Different engines are designed to have varying capabilities at different operating ranges, and are optimized for different conditions based on the engine manufacturer's designed operating characteristics. These different capabilities and characteristics are captured in fuel consumption values, which engine manufactures typically provide to a purchaser of the engine, such as a vehicle manufacturer or transmission manufacturer. In the case of a transmission manufacturer, the fuel consumption data provides data which can be useful in determining when a transmission shift operation should be made to achieve fuel efficient operation of the engine. Even though the provided fuel consumption data provides useful information for the purchaser, the fuel consumption values do not readily provide engine efficiency characteristics across an engine's speed and torque output. In addition, the format of the fuel consumption data is not consistent between one engine manufacturer and another engine manufacturer. Consequently, what is needed is a system and method for utilizing engine fuel consumption data to modify the operation of a transmission and to operate the engine efficiently.

SUMMARY

In one embodiment of the present disclosure, there is provided a method of controlling the operation of a vehicle transmission operatively connected to an engine having operating characteristics and operatively connected to a transmission control module having access to a memory. The method includes receiving fuel consumption data for an engine, converting the fuel consumption data for the engine to engine efficiency loss data representative of the engine operating characteristics, generating a set of polynomials to characterize the engine efficiency loss data, and generating a set of the set of polynomials, wherein the set of polynomials represents the operating characteristics the engine. The method further includes storing the set of polynomials in the memory, accessing the set of polynomials stored in memory with the transmission control module, and using the accessed set of polynomials to modify the operation of the transmission based on the operating characteristics of the engine.

In another embodiment, there is provided a transmission system configured to drive a drive assembly of a vehicle in response to an engine output shaft of an engine responding to a throttle command. The transmission assembly includes a transmission including an input configured to be coupled to the engine output shaft and an output configured to drive the drive assembly, a memory configured to store one or more engine patterns, wherein each of the one or more stored engine patterns includes a plurality of polynomials and further wherein the plurality of polynomials represents the operating characteristics of the engine. A transmission controller is operatively coupled to the transmission and to the memory. The transmission controller is configured to execute stored program instructions to: determine at least one of engine speed and engine torque from the received throttle command; determine a current operating condition of the transmission; access the memory to retrieve one of the one or more stored engine patterns; determine an updated operating condition of the transmission using the accessed engine pattern and the determined at least one of the engine speed and the engine torque; and modify the current operating condition of the transmission to an updated operating state of the transmission based on the determined updated operating condition of the transmission.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
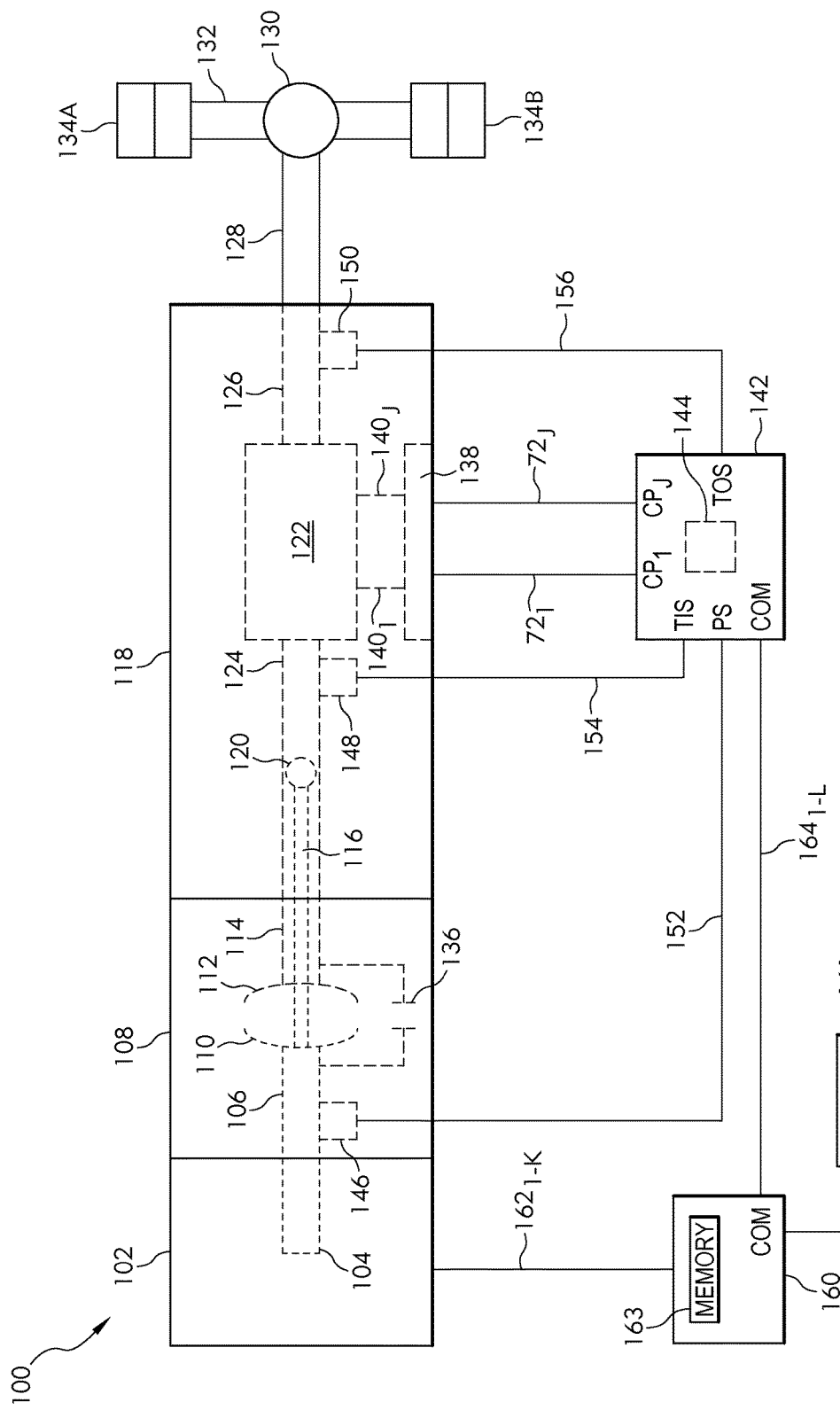
FIG. 1 is a block diagram of one embodiment of a powered vehicular system.

Referring now to FIG. 1, a block diagram and schematic view of one illustrative embodiment of a vehicular system 100 having an engine 102 and an automatic transmission 118 is shown. In the illustrated embodiment, the engine 102 may include an internal combustion engine, diesel engine, or other fuel power-generating devices. The engine 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the engine 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the engine 102. In this arrangement, the engine 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the engine 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission controller 142, or transmission control module, that includes a memory unit 144 accessibly by the transmission controller in one embodiment. In other embodiments, the memory unit is separately located from the transmission controller. The transmission controller 142 is illustratively microprocessor-based, and the memory unit 144 generally includes instructions stored therein that are executable by a processor of the transmission controller 142 to control operation of the torque converter 108 and operation of the transmission 118, i.e., shifting between the various gears of the planetary gear system 122. It will be understood, however, that this disclosure contemplates other embodiments in which the transmission controller 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states or operating conditions of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the engine 102. The speed sensor 146 is electrically connected to a pump speed input, PS, of the transmission controller 142 via a signal path 152, and the transmission controller 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission controller 142 via a signal path 154, and the transmission controller 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission controller 142 via a signal path 156. The transmission controller 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission controller 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission controller 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the controller 142 in accordance with instructions stored in the memory unit 144.

In the illustrated embodiment, the system 100 further includes an engine controller 160 having an input/output port (I/O) that is electrically coupled to the engine 102 via a number, K, of signal paths 162, wherein K may be any positive integer. In one embodiment, the engine controller 160 includes a memory unit 163 or has access to a memory. The engine controller 160 is operable to control and manage the overall operation of the engine 102. A throttle 161 is operatively connected to the controller 160 and provides a desired engine speed input to the controller 161 to adjust the output speed of the drive unit. In other embodiments, the engine speed input is provided by the controller 160 as a cruise control generated drive unit speed. The engine controller 160 further includes a communication port, COM, which is electrically connected to a similar communication port, COM, of the transmission controller 142 via a number, L, of signal paths 164, wherein L may be any positive integer. The one or more signal paths 164 are typically referred to collectively as a data link. Generally, the engine controller 160 and the transmission controller 142 are operable to share information via the one or more signal paths 164 in a conventional manner. In one embodiment, for example, the engine controller 160 and transmission controller 142 are operable to share information via the one or more signal paths 164 in the form of one or more messages in accordance with a society of automotive engineers (SAE) J-1939 communications protocol, although this disclosure contemplates other embodiments in which the engine controller 160 and the transmission controller 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN). In addition, a Hardwire TPS (throttle position sensor) to transmission controller or Hardwire PWM (pulse width modulation) to transmission controller can be used.

Transmission shift schedules and other related instructions are included in software which is downloaded to the transmission controller 142. In other embodiments, the transmission controller 142 is preprogrammed. The transmission controller 142 controls the shifting of the transmission by electrically transferring instructions to the transmission such that certain actions are carried out by the synchronizers, brakes, clutches, dog clutches, pistons, etc. In one non-limiting embodiment, the transmission controller 142 is part of a transmission control circuit that can further include an electronic solenoid and valve assembly for controlling the engaging and disengaging of clutch assemblies, etc. Components within the transmission 118 are activated electrically, mechanically, hydraulically, pneumatically, automatically, semi-automatically, and/or manually. The transmission controller circuit is able to control the operation of the transmission to achieve desired performance.

Based on instructions in a transmission software program, the transmission control circuit (e.g., transmission controller 142) determines a shift schedule depending on a vehicle's driving condition and executes instructions contained in the software by sending signals through to control the transmission 118. The transmission controller 142, in different embodiments, also receives measurement data from the transmission 118 such as, for example, input speed from the input speed sensor 146 and output speed from the output speed sensor 130. In one embodiment in which the transmission does not include a torque converter, the transmission may only have an input speed sensor 146 and output speed sensor 150. The transmission controller 142, in different embodiments, also calculates various parameters including transmission gear ratios or ranges, which depend on the ratio of input speed to output speed.

The transmission controller 142, in different embodiments, receives accelerator pedal position (i.e., throttle percentage) from a throttle input source, for example throttle 161, which, in different embodiments, is coupled to the engine controller 160 or vehicle control module (not shown) for transmitting throttle data over the data bus.

Information such as accelerator pedal position that is communicated over the data bus is not limited to a particular engine/transmission configuration. Instead, the data bus can be adapted to most vehicle setups.

The transmission controller 142 is operatively connected to the transmission 118 through the described sensors and data bus. The engine 102 is operatively connected to the engine controller 160, also known as an engine control module (ECM) to control the engine 102. The engine controller 160 may be further connected to various sensors of the vehicle that provide the engine controller 160 with various operating conditions associated with operation of the engine 102.

The transmission 118, in different embodiments, is configured to provide a torque-speed conversion from the generally higher speed engine 102 to a slower but more forceful output to the drive assembly including the propeller shaft 128. The drive assembly, in different embodiments, includes drive wheels, caterpillar tracks, ground engaging traction devices, etc. that moves the motor vehicle when driven by the engine 102 via the transmission 118.

The engine controller 160 and transmission controller 142, in different embodiments, are implemented using analog and/or digital circuit components. In one embodiment, the engine controller 160 and the transmission controller 142 each include a processor, such as a microcontroller or microprocessor. Furthermore, the engine controller 160 and transmission controller 142 each have one or more associated memory devices 144, 163 configured to store instructions to be respectively executed by the engine controller 160 and the transmission controller 142. The memory devices 144, 163 in different embodiments, include programmable read only memory devices, flash memory devices, random access memory devices, and/or other storage devices that store instructions to be executed and data to be processed by the engine controller 160 and the transmission controller 142.

Figure 2:
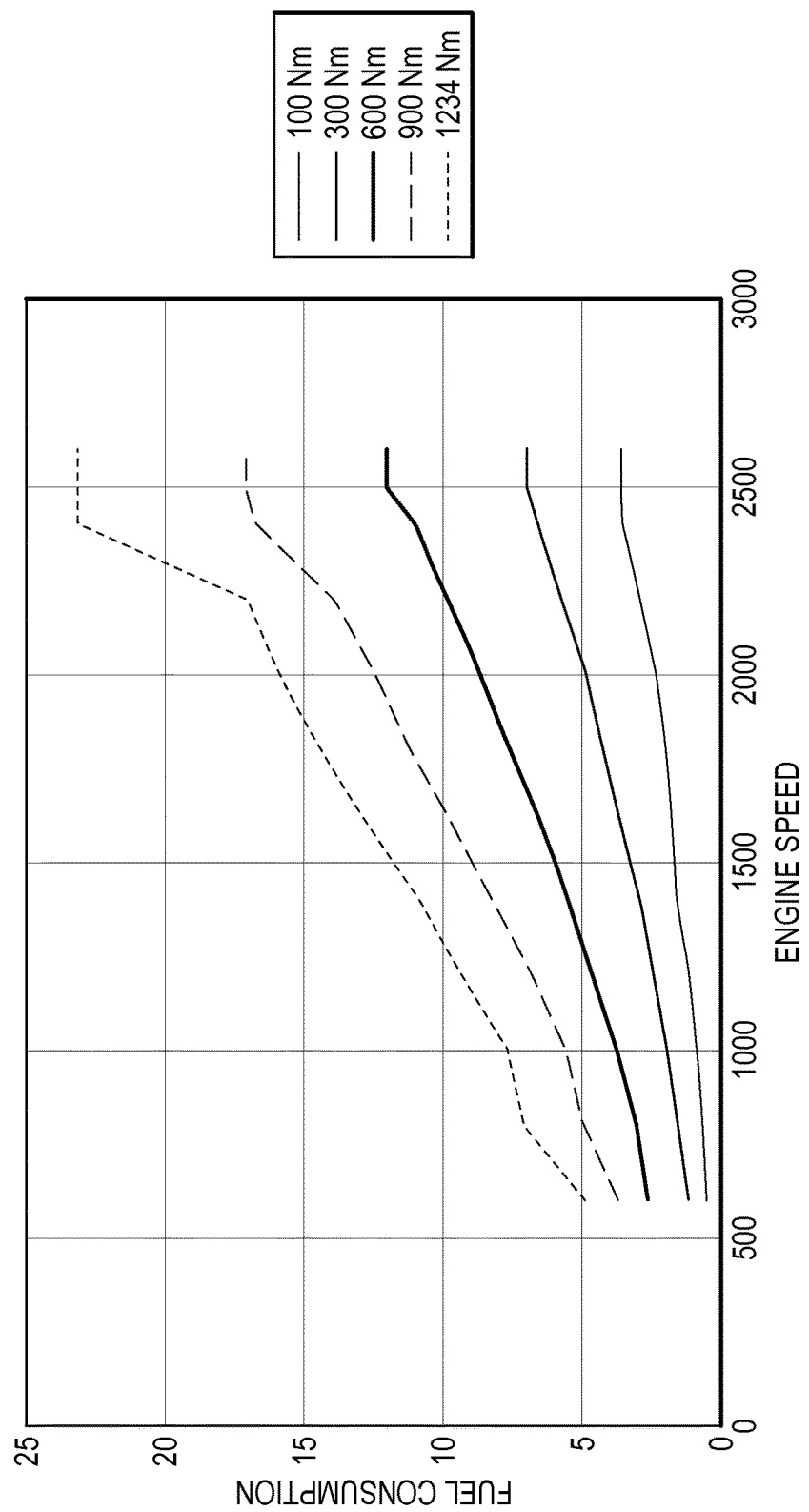
FIG. 2 is a graph representing fuel consumption data for an engine showing fuel consumption versus engine speed at a plurality of different engine torque outputs.

Fuel powered engines have varying capabilities at different operating ranges, and are optimized for different conditions based on the manufacturer's and the customer's intended applications. Each different type of engine is characterized by the manufacturer, and these characteristics are provided to the customer as engine fuel consumption data. In some cases, the engine fuel consumption data does not cover the entire range of engine operating characteristics. In other cases, the fuel consumption data is not provided, has not been updated, or is not available. The engine fuel consumption data is generally consistent for each engine of the same type, but different engines of different types have different fuel consumption data characteristics. In each instance of fuel consumption data, however, fuel consumption values increase with increasing torque and speed. In one example illustrated in FIG. 2, for instance, as the engine speed increases, the fuel consumed also increases. The graph of FIG. 2 also illustrates that the torque provided by the engine generally increases while engine speed and fuel consumption increase up to a certain value of fuel consumption and engine speed, at which point the torque levels off and no longer increases.

The engine fuel consumption data, while helpful for determining the operating characteristics of an engine, does not always provide the necessary information to optimize the operation of a transmission responding to the rotational torque developed by an engine. In addition, the engine fuel consumption data generated by different engine manufacturers is not represented in a standardized format which can be consistently used by a transmission manufacturer which provides transmissions to a wide variety of vehicle manufactures using different engines. For instance, some engine manufacturers provide the engine fuel consumption data as brake specific fuel consumption data in units of liters per kilowatt hour. Brake specific fuel consumption data is determined by the rate of fuel consumption divided by the power produced. As can be seen, therefore, a transmission manufacturer must be able to design a transmission which accommodates a large number of different types of engines. Unfortunately, however, the engine fuel consumption data provided by an engine manufacturer is not in a form which is readily used by a transmission manufacture. The engine fuel consumption data is not only data intensive, but is also not configured to provide the information in a fashion which is efficiently used during transmission operation.

Figure 3:
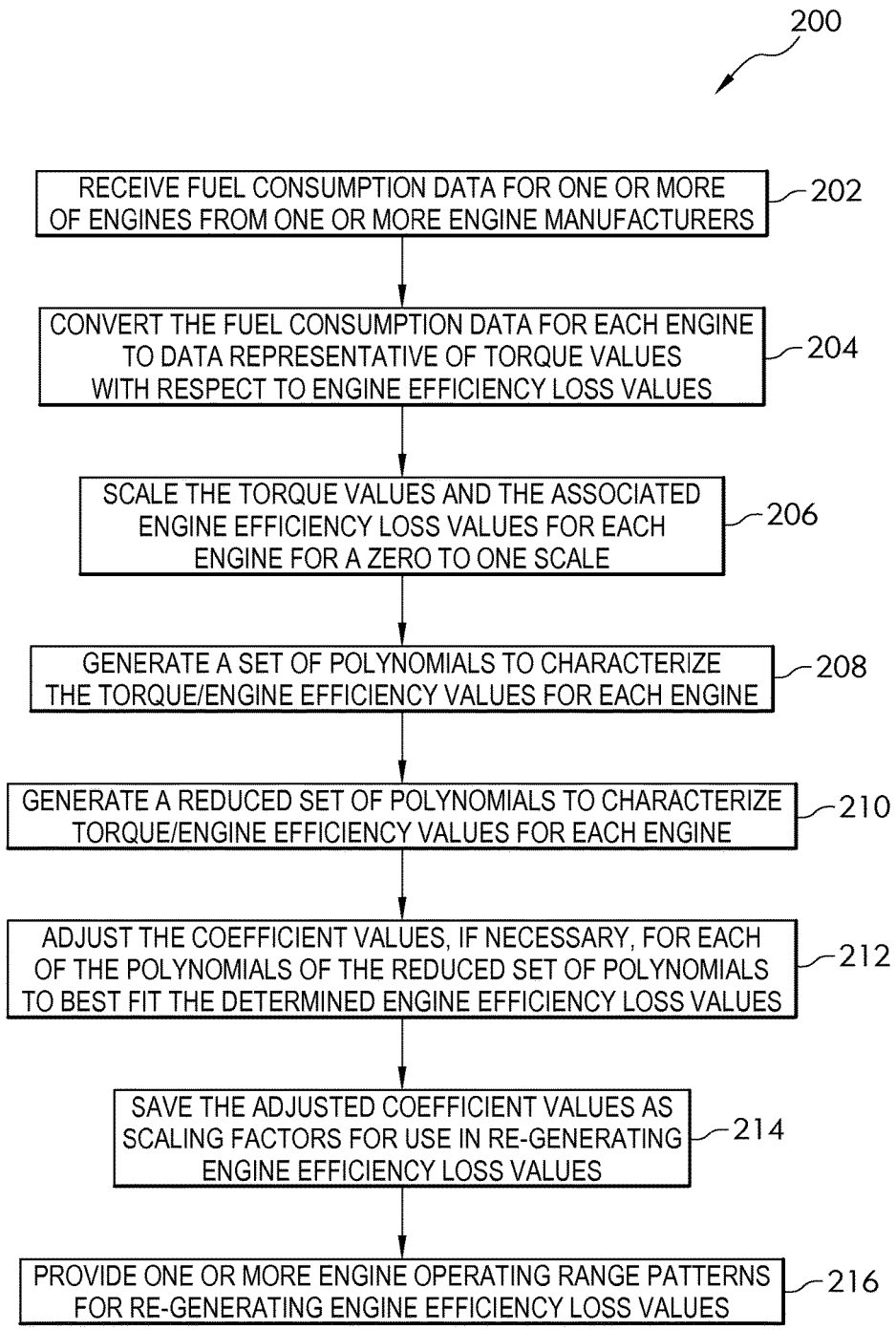
FIG. 3 is a block diagram of a process to determine a pattern representative of the fuel consumption data of an engine using a set of polynomials.
Figure 4:
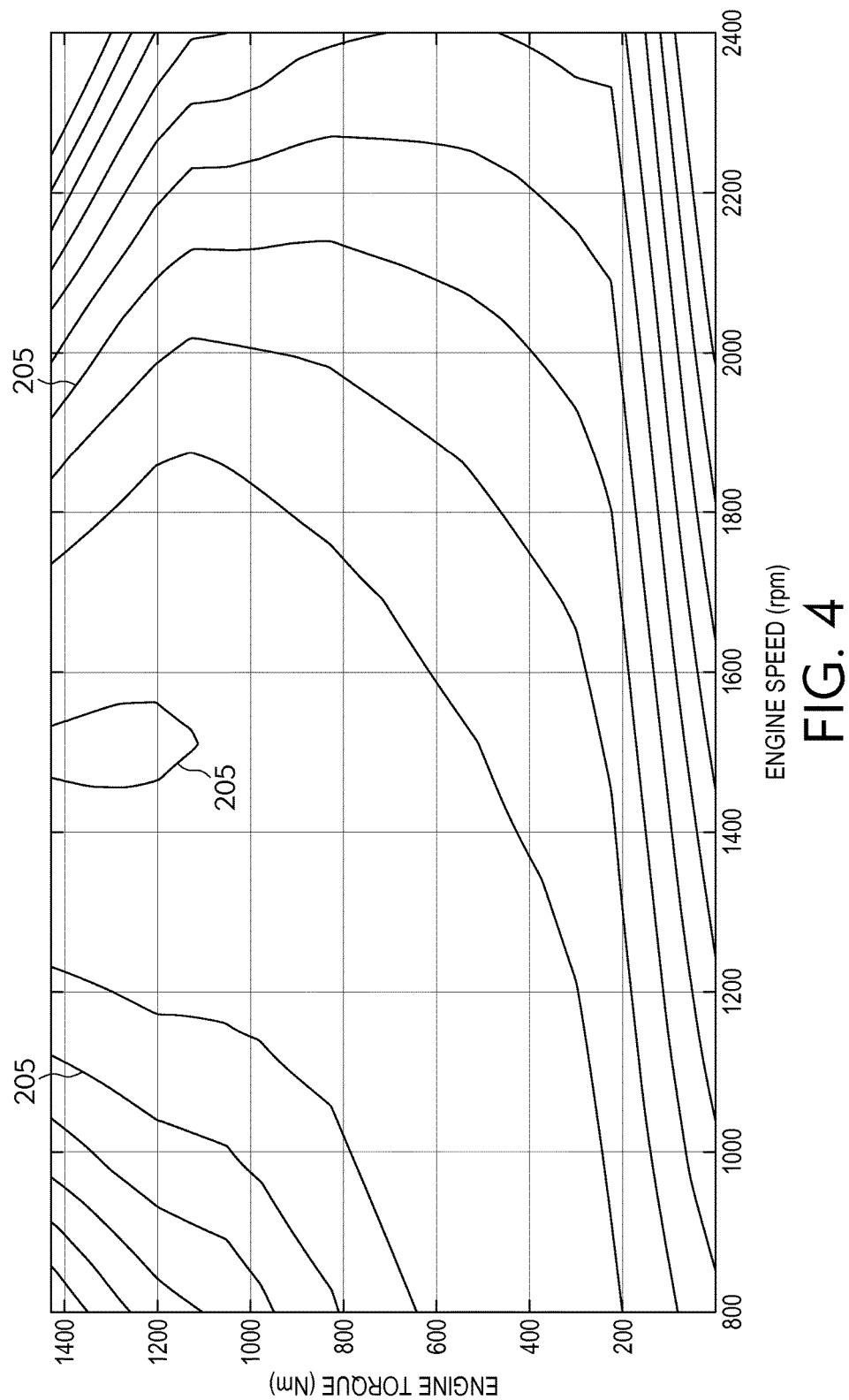
FIG. 4 is a graph representing engine efficiency loss data (EEL) of an engine showing engine torque versus engine speed.

FIG. 3 illustrates a block diagram 200 of a process to reduce or compress engine fuel consumption data to a representative model of the engine operating characteristics embodied as a pattern or map which is stored in the memory 144 for use by the transmission controller. In other embodiments, one or more other memories accessible to the transmission controller 142 are used. The transmission controller 142 accesses the memory 144 during transmission operations to efficiently drive a vehicle drive train in response to engine speed, engine torque, or vehicle speed, or other engine operating conditions which the transmission converts to a transmission output torque provided at transmission output shaft 126. To compress engine fuel consumption data to a pattern, a set of fuel consumption data for one or more engines is received from one or more engine manufacturers at block 202. In other embodiments, the manufacturer for the engine and transmission are provided by the same company. In other configurations, the engine manufacturer is a different company than the company manufacturing the transmission. Once received, each set of fuel consumption data is converted to data representative of torque values with respect to engine efficiency loss values at block 204. The engine efficiency loss values are generated for any speed or torque values for the engine being defined. Please see FIG. 4 for one example of engine efficiency loss values (EEL).

Each engine is therefore characterized as having an EEL pattern which provides engine operating characteristics of engine torque versus engine speed with EEL lines 205. Each of the lines 205 illustrates a single EEL value which is a consistent value along the continuous line plotted against engine torque and engine speed. Consequently, each of the EEL lines 205 illustrates a different value of engine efficiency loss.

An EEL value provides a measure of the variance of fuel consumption, with respect to the most efficient operating point. The loss values indicate a loss in engine power over the operating range of the engine and therefore indicate the engine operating conditions which are the most efficient operating conditions. The engine efficiency loss value is, therefore, determined as being a fuel consumption efficiency ratio, α, minus the power provided for each of the provided engine fuel consumption data points.

$$\text{Engine Efficiency Loss} = \alpha - \text{Power} \quad \quad 5$$

In one embodiment, the EEL value is provided in kilowatts. By converting the engine fuel consumption data for each engine to corresponding engine efficiency loss values, a normalized set of operating characteristics for each engine is provided. By providing a normalized set of operating characteristics for each engine, the operation of one type of transmission is efficiently controlled when engines of different types are used with the one type of transmission.

Engine power is an integral part of the EEL calculation. To provide a standardized set of data for each engine so that operating characteristics of different engines are comparable with respect to each other, the engine power of one engine is scaled to match another power range of a different engine having a potentially different speed and torque range. By scaling engine power, the EEL values calculated by a pattern definition are consistent with different torques and speeds. In order to properly scale the patterns, the torque and speed ranges are scaled based on the operating ranges from each pattern. Consequently, the torque range for each engine is scaled from zero (0) to the peak torque of the engine. Therefore, in order to scale torque between the pattern definition and another peak torque, the following equation is used to determine the scaled torque factor.

$$TrqScaled = \frac{PeakTrq_B}{PeakTrq_{Pattern}}$$

Where: TrqScaled=Scaled Torque Factor; PeakTrqB=Peak Torque of the other torque range (units of newton meters); and $PeakTrq_{Pattern}$=Peak Torque of the Engine on which the EEL pattern is based (units of newton meters).

Once the torque values for each of the EEL calculations are determined, scaling of the range of speeds experienced by an engine is determined for each engine. The speed scaling factor is based on three main components, or "ratios", that are ratios of the two different speed ranges. (One speed range is from the minimum to the maximum operating speed of the engine which was used to develop the pattern and the other speed range is from the minimum to the maximum operating speed for whatever other engine currently being evaluated by using the same pattern.) One ratio is the maximum operating speed from the pattern engine to a set minimum speed. A second ratio is the maximum operating speed from the engine being evaluated using the pattern to evaluate to the same set minimum speed. The third ratio is the more complex one that relates the current engine speed to the minimum operating speed from the pattern and the maximum operating speed of the engine you're evaluating to the minimum operating speed from the pattern. The overall speed scaling factor combines these three ratios in the equation for SpdScaled as described below.

The scaling of speed ranges introduces complexities because of the possibility of a large number of different operating ranges for an engine. The scaling of speed ranges is therefore made, in one embodiment, to avoid the introduction of an error which could result if the scaling factor is calculated to be zero (0) or a negative number. The speed scaling factor is, therefore, based on a ratio of the different minimum and maximum operating points for both the pattern, and the other operating range.

$$SpdScaled = 1 + \frac{\alpha(R_B - R_{Pattern})}{(1-\alpha) + \alpha R_{Pattern}} \text{ with}$$

$$R = \frac{\text{Max Speed}}{\text{Min Speed}_{set}} \text{ and } \alpha = \frac{Speed_{Calc} - Speed_{Pattern\ Min}}{Speed_{HSG} - Speed_{Pattern\ Min}}$$

Where: SpdScaled=Scaled Speed Factor, α=Speed ratio based the other engine range's high speed governor ($Speed_{HSG}$), minimum speed on which the EEL pattern is based ($Speed_{Pattern\ Min}$), and the speed at which the EEL value is to be calculated ($Speed_{Calc}$); $R_B$=Ratio value based on the other engine range's high speed governor and a set speed value above which the EEL calculation will be allowed; and $R_{Pattern}$=Ratio value based on the maximum speed on which the EEL pattern is based and a set speed value above which the EEL calculation will be allowed.

The overall power scaling factor is then the speed and torque scaling factors multiplied together. This calculated factor enables the comparison between EEL values for each different engine having torque and speed ranges on which the pattern is based. Once EEL values have been calculated for the engine, the next step is to scale the torque and EEL values to a 0-1 scale. By scaling the EEL values, succeeding calculations to provide the functions used to calculate EEL values based on this engine pattern and any torque value have a reduce complexity, and therefore require fewer data manipulations. Calculated EEL values that are based on negative torques are not used, in one embodiment, in creating the pattern. The 0-1 torque scale includes torque values of 0 or 1 Nm up to the torque limit for the engine. The maximum EEL value, before scaling to 1, is to be saved as a scaling factor for the specific pattern. These steps are completed to scale the torque values and the associated engine efficient loss values for each engine for a zero to one scale as shown at block 206 of FIG. 3.

Figure 5:
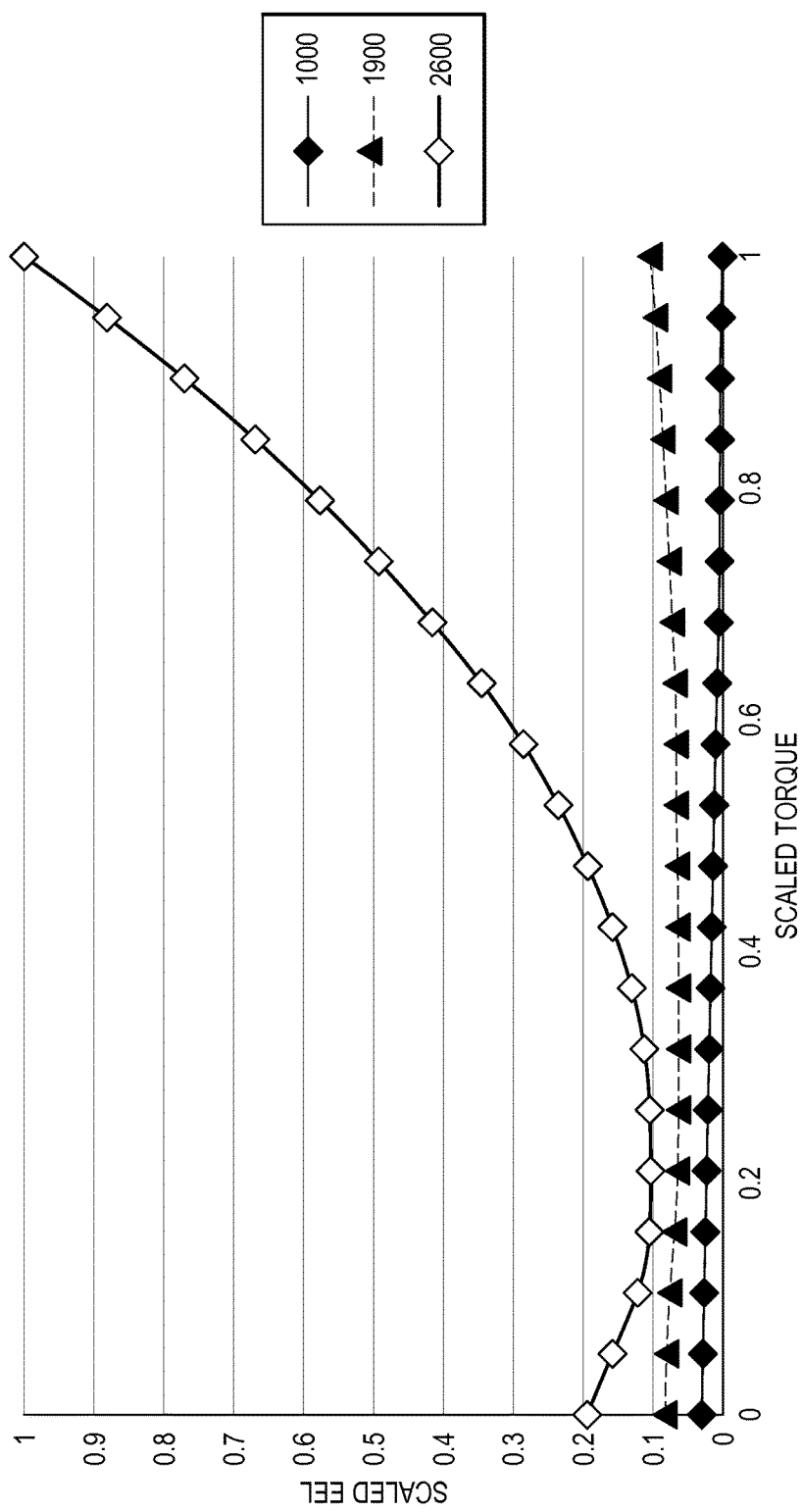
FIG. 5 is a graph representing scaled EEL values versus scaled torque with respect to engine speed.

Once the EEL values have been scaled, a plurality or set of polynomials is generated for the varying EEL values and torque values for lines of constant speed at block 208 of FIG. 3. Scaled EEL values have a parabolic or cubic relationship with scaled torque values for any given speed range as illustrated in FIG. 5. The major portion of an EEL pattern is the coefficients that make up these polynomials. In one embodiment, the process for generating the polynomials of EEL values versus torque is to analyze the data with data plotting software such as curve fitting software, including non-linear curve fitting software. In one embodiment, a trend line calculation function available in a software package known as Excel, available from Microsoft Corporation, Redmond, Wash., is used.

As described herein, negative torques, in one embodiment, are not incorporated in pattern definitions or calculations of the polynomials. The polynomials are determined to represent the actual EEL values over the entire operating range of the engine.

In an embodiment incorporating EEL values from negative torque ranges into the polynomial calculations results in vastly different polynomials, that are not able to acceptably and accurately reproduce EEL values for the an engine's entire operating range. Consequently, in another embodiment, the overall shape and pattern of EEL values is to determine polynomials having only positive torque values. In other embodiments, however, EEL values for negative torques are predicted sufficiently accurately by linearly increasing the projected values for 0 Nm torque. In other embodiments, the more negative a torque the worse the torque's efficiency should be, so having a simple linear increase of low torque values can provide accurate results.

Once a set of polynomials has been generated to characterize the torque/engine efficiency values for an engine, a reduced set of polynomials is generated at block 210 of FIG. 3. In one embodiment, the number of speed polynomials is reduced to seven, while still representing the full speed range of the engine. Reducing the number of representative polynomials to seven has been shown to maintain the integrity of engine efficiency loss values calculated while condensing the amount of data to be stored in memory. In one embodiment, the first polynomial represents the lowest engine speed. The last polynomial, or seventh polynomial in this embodiment, represents the highest engine speed, with the other five polynomials spaced evenly throughout the engine's operating range. The number of polynomials is selected based on a study conducted with simulations running the same engine pattern generated with a variety of number of polynomials representing that pattern. In this embodiment, the seven polynomials are sufficient to calculate the EEL values with minimal degradation in fuel economy. In other embodiments, however, the number of polynomials selected is more, or less, than seven. The number of polynomials is selected based on the desired accuracy of reconstructed engine data using the polynomials, the amount of memory available for storing the polynomials, and the speed of polynomial calculations provided by the transmission controller. The present disclosure, however, is not limited to patterns having a number of polynomials, and other data abstraction representations of an engine's fuel consumption data are included.

The results of each of the representative (reduced set) polynomial equations does not always provide the same result when compared to the result if the originally derived polynomials are used. The results using the reduced set of polynomials, however, provide values which are sufficient to effectively and efficiently operate a transmission system. Because the set of seven polynomial equations represents the entire operating range of the engine, the polynomial equations are able to reproduce all of the engine efficiency loss values, with an acceptable amount of error.

In one example, a software program known as MATLAB® available from Mathworks, Natick, Mass., is used to generate a reduced set of polynomial equations having a minimized or a least possible error. Other software programs, in other embodiments, are also used to determine the reduced set of polynomials. In one embodiment, the software program, MATLAB®, generates a set of polynomials that corresponds to the entire range of engine efficiency loss values with an average error of around 1 kilowatt or less. This program completes a least squares fit with the scaled EEL values for a given engine speed, within the operational torque limit of that engine speed. In other embodiments, other programs which provide a least squares fit are used. The finalized reduced set of polynomial equations represents the varying relationship between the engine efficiency loss values at different torque and speed conditions for the engine. The reduced set of polynomials forms the basis of an engine pattern configured to define the engine operating characteristics.

When reducing the larger set of polynomial equations to the smaller or reduced set of polynomial equations, the polynomial coefficient values are adjusted to better represent the EEL values with the now limited number of polynomials as determined at block 212. By adjusting the coefficient values, the reduced set of polynomials reasonably accurately represents the larger set of polynomial equations and therefore represents the manufacturer's engine data. The EEL values for those speeds that are no longer included in the pattern definition are interpolated. Additional modifications to the coefficient values, in some embodiments, are made to maintain the engine data characteristics. Since the reduced set of polynomials includes speed specific polynomials, a basis for understanding how an EEL pattern shape changes over different speed ranges is provided. The patterns preserve the relationship between EEL values at differing torque and speed points. Once the pattern produced by the polynomials and the EEL pattern on which the polynomials are based look similar, the coefficients are determined to be finalized for use. Similarity between patterns is determined when the average error between the two is sufficiently reduced to provide desired operating results. Even if the coefficients are consider to be "finalized", the coefficient values, in some embodiments, are adjusted at a later time, if real world testing proves that the pattern is not sufficiently close to the recorded data for that engine type. The adjusted coefficient values are saved as scaling factors for use in re-generating engine efficiency loss values at block 214.

In other embodiments, a software program, such as the software program known as MATLAB®, is used to generate a predetermined number of polynomials, the number of which is not reduced to a smaller number or reduced set of polynomials. In such a program, the predetermined number of polynomials is provided before a set of polynomials is determined by the software program. In another embodiment, the number of polynomials is determined by the software program to meet a predetermined value of accuracy.

Once a final set of polynomials and adjusted coefficient values have been determined, a finalized engine pattern for each different type of engine is provided at block 216. The engine pattern includes the coefficients of the reduced set of polynomials. In the embodiment of seven polynomials, a seven by four matrix is provided to represent the way engine efficiency values change with respect to speed and torque for the given engine across its operating range. The pattern for an engine also includes at least one scaling factor which is configured to represent the maximum engine efficiency loss value from the original engine calculations. A peak torque value from the original engine on which the pattern is based for power scaling purposes is also provided. A minimum engine speed and a maximum engine speed from the original engine on which the pattern is based are for power scaling purposes.

Figure 6:
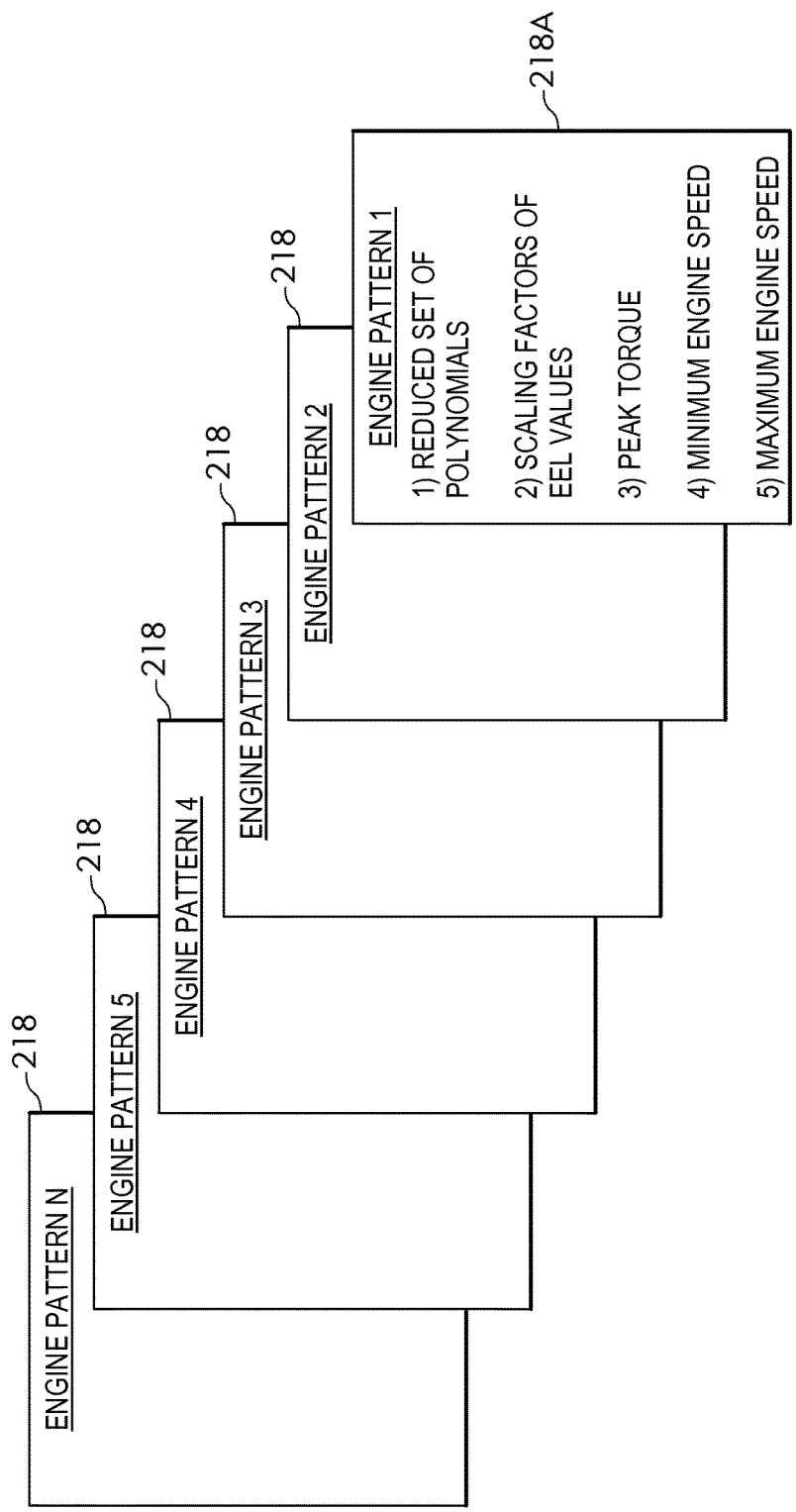
FIG. 6 is a schematic representation of a plurality of engine patterns each representative of the fuel consumption data of an engine.

Once an engine has been patterned, each engine is defined by an engine pattern 218, such as pattern 218A, as illustrated in FIG. 6. Pattern 218A includes the five definitions of: the reduced set of polynomials, the scaling factors of the EEL values, the peak torque value, the minimum engine speed value, and the maximum engine speed value. One or more of these patterns are stored in the memory 144 of the transmission system of FIG. 1. For instance, if the transmission to be used in the vehicle is to be used with only one type of engine, then a single pattern is stored in memory. If, however, a vehicle manufacturer uses a single type of transmission with different types of engines, in other embodiments, more than one pattern is stored in the memory 144 to accommodate the different types of engines.

Once one or more of the engine patterns are stored in the memory 144, the type of engine to which the transmission 118 is connected is identified to the transmission controller 142. In one embodiment, the engine type is identified in the memory 163 of the engine controller 160. Communication between the engine controller 160 and the transmission controller 142 identifies the engine type to the transmission controller 142. In another embodiment, the engine type is identified to the transmission controller 142 as a stored value in the transmission accessible memory 144. With the identification of the engine type and the storing of the one or more patterns 218, the transmission controller 142 is configured to operate the transmission 118 in an efficient manner.

Figure 7:
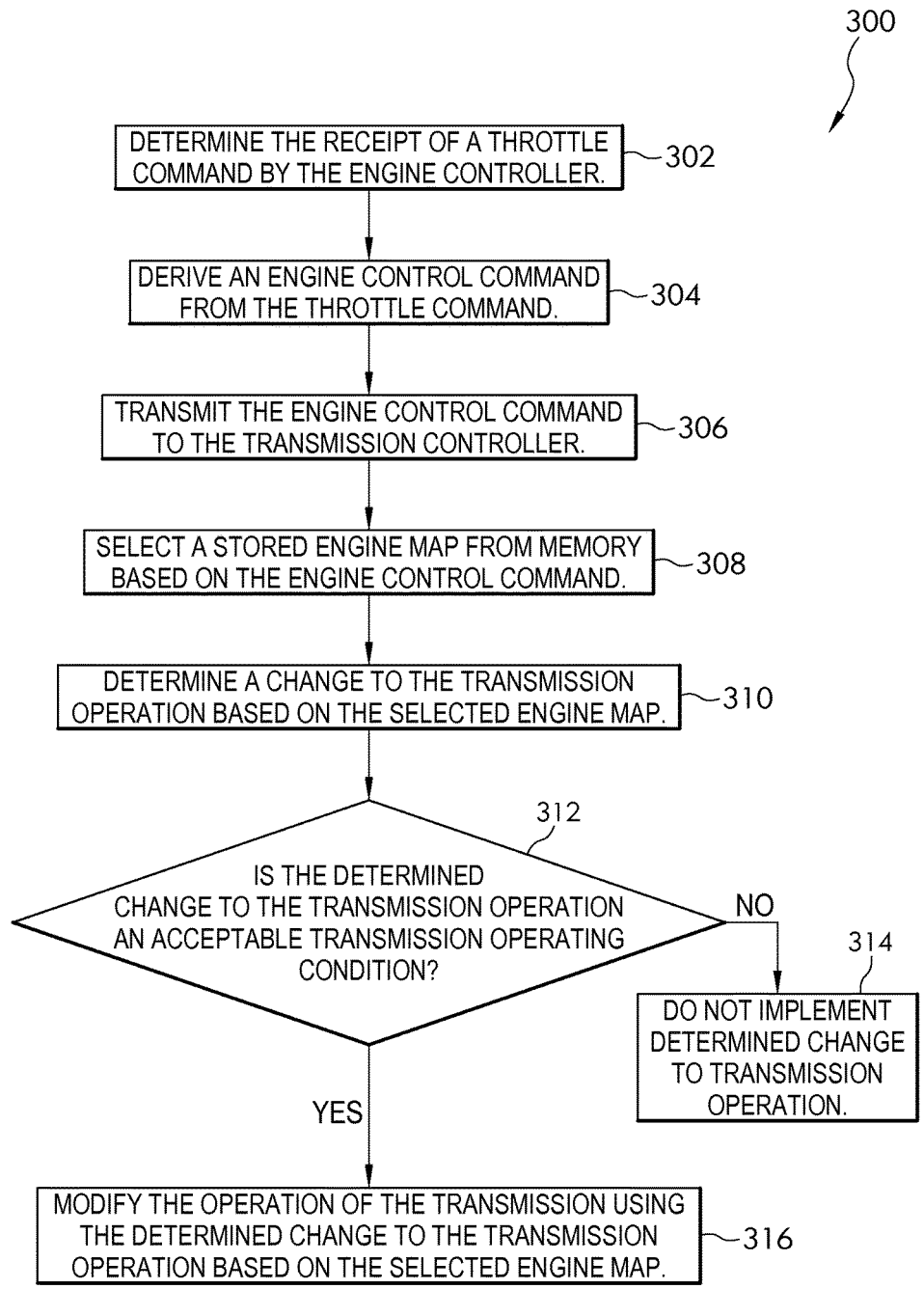
FIG. 7 is a block diagram of a process to control the operation of a transmission using an engine pattern.

FIG. 7 is a block diagram 300 of a process to control the operation of the transmission 118 using one of the engine patterns 218. Once a vehicle is started or while the vehicle is running, a vehicle operator provides a throttle command to the engine controller 160 through the throttle 161. The throttle command is received by the engine controller 160 at block 302. Once received, an engine output control command is determined based on the throttle command at block 304. In one embodiment the engine output control command is configured by the controller 160 to cause the engine 102 to develop an output torque at the output shaft 104 through a fuel command. The engine controller 160, in different embodiments, provides other engine control commands based on the throttle command, such as an engine output torque command or a speed command to control the engine output. Any one, some, or all of these commands are provided to the transmission controller 142 at block 306. In other embodiments, the transmission controller receives the throttle command directly from the throttle.

After the engine command is received by the transmission controller 142, the transmission controller 142 accesses the memory 144 to select a stored engine pattern which corresponds to the type of engine 102 driving the transmission 116. See block 308. The stored engine pattern includes the reduced plurality of polynomials. Upon receipt of the engine command, the transmission controller 142 determines a new or updated operating condition of the transmission when compared to the current operating state of the transmission based on the selected pattern. See block 310. The updated operation condition is determined by the transmission controller 142 using the contents of the selected pattern 218 including the reduced set of polynomials. Once the updated operating condition is determined, the transmission controller 142 compares the updated operating condition to one more limiting operating conditions which are also available to the transmission controller 142 through access to the memory 144 or otherwise at block 312.

The limiting operating conditions define operating conditions of the transmission which, if determined, would place the transmission in an undesirable operating condition which could damage or otherwise restrict the efficient operation of the transmission. The transmission controller 142 monitors one or more diagnostic responses and conditions to ensure that a shift occurs when the shift is considered by the transmission controller 142 to be one which does not reduce the operating efficiency of or damage the vehicle including, but not limited to, the transmission, the engine, the engine drive shaft, and the vehicle drivetrain. For instance, the following conditions, in different embodiments, are ones which would not allow a shift to occur: i) if a shift has just occurred and reapplying a clutch again might cause high temperatures within the clutch that could degrade the life of the clutch, a shift is prevented from occurring; ii) if a shift would apply unacceptable levels of torsional loads on either the engine shaft or the drivetrain shaft, a shift is prevented from occurring; iii) if a shift would force the engine speed to drop too low (below engine idle speed) or if the engine speed would be too high (above the engine high speed governor), a shift is prevented from occurring. These conditions are not limiting and other conditions which prevent shifting are included.

If the determined operating condition is unacceptable, then the determined change is not implemented by the transmission controller 142 at block 314. In one embodiment, the transmission controller 142 provides a fault alert to the operator that the transmission does not accommodate the desired throttle command. In one embodiment, the fault alert prevents the transmission from changing the current state of operation. In another embodiment, the fault alert indicates to the user that a fault has occurred, but allows the change in operation of the transmission but at a reduced efficiency operating point.

If, however, the desired throttle command does not put the transmission in an undesirable state of operation, the transmission controller modifies the current operating condition of the transmission to the updated operating condition to move the vehicle at different speed or in a different gear. See block 316.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method of controlling the operation of a vehicle transmission operatively connected to an engine having operating characteristics and operatively connected to a transmission control module having access to a memory, the method comprising:
receiving fuel consumption data for an engine, wherein the fuel consumption data identifies a range of operating characteristics of the engine from a minimum value to a maximum value;
converting the fuel consumption data for the engine to data representative of engine torque data with respect to engine efficiency loss data representative of the engine operating characteristics;
generating a set of polynomials to characterize the engine efficiency loss data, wherein the set of polynomials is based on a curve fitting of the engine efficiency loss data and the engine torque data;
storing the set of polynomials in the memory;
accessing the set of polynomials stored in memory with the transmission control module; and
using the accessed set of polynomials to modify the operation of the transmission.

2. The method of controlling the operation of a vehicle transmission of claim 1 wherein the converting the fuel consumption data for the engine to engine efficiency loss data includes engine efficiency loss values corresponding to the engine torque data and to engine speed.

3. The method of controlling the operation of a vehicle transmission of claim 2 wherein the converting the fuel consumption data for the engine to engine efficiency loss data includes determining a range of torque values from zero to a maximum torque value, wherein the maximum torque value is based on the received fuel consumption data, and a range of engine efficiency loss values from a range of zero to a maximum efficiency loss value which is based on the received fuel consumption data and scaling the torque values to a zero to one scale and scaling the engine efficiency loss values to a zero to one scale.

4. The method of controlling the operation of a vehicle transmission of claim 3 wherein the generating a set of polynomials to characterize the engine efficiency loss data includes a generating a set of polynomials to characterize the relationship between the scaled engine efficiency loss values and the scaled torque values.

5. The method of controlling the operation of a vehicle transmission of claim 4 wherein the generating a set of the set of polynomials includes generating the set to include a first polynomial representing a lowest engine speed, wherein the lowest engine speed is based on the received fuel consumption data, generating a last polynomial representing a highest engine speed, wherein the highest engine speed is based on the received fuel consumption data, and generating one or more intermediate polynomials representing one or more intermediate engine speeds between the lowest engine speed and the highest engine speed.

6. The method of controlling the operation of a vehicle transmission of claim 5 wherein the set of polynomials includes variables and coefficients and the generating the set of polynomials includes modifying a value of one or more of the coefficients to provide a set of polynomials having adjusted variables and coefficients to minimize an error between the engine efficiency loss values and the set of polynomials.

7. The method of controlling the operation of a vehicle transmission of claim 6 wherein the converting the fuel consumption data for the engine to engine efficiency loss data representative of the engine operating characteristics includes determining a scaling factor representative of a maximum engine efficiency value based on the received fuel consumption data and from the engine efficiency loss data.

8. The method of controlling the operation of a vehicle transmission of claim 7 wherein the converting the fuel consumption data for the engine to engine efficiency loss data representative of the engine operating characteristics includes determining a peak torque value from the engine efficiency loss data.

9. The method of controlling the operation of a vehicle transmission of claim 8 includes determining a minimum engine speed based on the received fuel consumption data for the engine.

10. The method of controlling the operation of a vehicle transmission of claim 9 includes determining a maximum engine speed based on the received fuel consumption data for the engine.

11. The method of controlling the operation of a vehicle transmission of claim 10 further comprising:
storing the scaling factor, the peak torque value, the minimum engine speed, and the maximum engine speed in the memory;
accessing scaling factor, the peak torque value, the minimum engine speed, and the maximum engine speed stored in memory with the transmission control module; and
using the accessed scaling factor, the peak torque value, the minimum engine speed, and the maximum engine speed to modify the operation of the transmission based on the operating characteristics of the engine.

12. The method of controlling the operation of a vehicle transmission of claim 1 wherein the generating a set of the set of polynomials includes generating a set of polynomials including at least seven polynomials.

13. The method of controlling the operation of a vehicle transmission of claim 12 wherein the generating a set of the set of polynomials includes generating a set of polynomials consisting of seven polynomials.

14. A transmission system configured to drive a drive assembly of a vehicle in response to an engine output shaft of an engine responding to a throttle command, the transmission assembly comprising:
a transmission including an input configured to be coupled to the engine output shaft and an output configured to drive the drive assembly;
a memory configured to store one or more engine patterns, wherein each of the one or more stored engine patterns includes a plurality of polynomials, wherein the plurality of polynomials represents the operating characteristics of the engine and is based on a curve fitting of engine efficiency loss data and engine torque data; and
a transmission controller operatively coupled to the transmission and to the memory, the transmission controller configured to execute stored program instructions to:
determine at least one of engine speed and engine torque from the received throttle command;
determine a current operating condition of the transmission;
access the memory to retrieve one of the one or more stored engine patterns;
determine an updated operating condition of the transmission using the accessed engine pattern and the determined at least one of the engine speed and the engine torque; and
modify the current operating condition of the transmission to an updated operating condition of the transmission based on the determined updated operating condition of the transmission.

15. The transmission system of claim 14 wherein the transmission controller is further configured to execute stored program instructions to:
determine whether the updated operating condition of the transmission is an unacceptable operating condition including one or more of the following: i) if a shift of the transmission has just occurred and reapplying a clutch might cause temperatures within the clutch sufficient to degrade the life of the clutch; ii) if a shift of the transmission would apply unacceptable levels of torsional loads on either an engine shaft or a drivetrain shaft; iii) if a shift of the transmission would force a speed of the engine to drop below an engine idle speed; iv) or if a shift of the transmission would force a speed of the engine to exceed an engine speed determined by an engine high speed governor.

16. The transmission system of claim 15 wherein the memory is configured to store one or more of the unacceptable operating conditions, wherein the unacceptable operating conditions prevent a shift of the transmission.

17. The transmission system of claim 16 wherein the transmission controller is further configured to execute stored program instructions to:
compare the updated operating condition to the stored one or more unacceptable transmission operating conditions to determine whether the updated operating condition is an acceptable transmission operating condition.

18. The transmission system of claim 17 wherein the transmission controller is further configured to execute stored program instructions to:

not modify the current operating condition of the transmission to the updated operating condition if the updated operating condition is one of the unacceptable operating conditions; and provide an alert indicating that the updated operating condition is one of the unacceptable operating conditions.

19. The transmission system of claim 18 wherein the transmission controller is further configured to execute stored program instructions to:

modify the current operating condition of the transmission to the updated operating condition if the updated operating condition is an acceptable operating condition.

20. The transmission system of claim 19 wherein the stored one or more engine patterns includes a scaling factor of engine efficiency loss values, a peak torque value, a minimum engine speed value, and a maximum engine speed value, wherein the minimum engine speed value and maximum engine speed value are based on a set of received fuel consumption data for an engine.

* * * * *